(12) United States Patent
Lee

(10) Patent No.: US 8,506,702 B2
(45) Date of Patent: Aug. 13, 2013

(54) MANUFACTURING METHOD OF LIGHTWEIGHT CONSTRUCTION MATERIALS USING SLUDGE WASTE

(75) Inventor: Se-Lin Lee, Chungcheongnam-do (KR)

(73) Assignee: Se-Lin Lee, Chungcheongnam-do (KR)

( * ) Notice: Subject to any disclaimer, the term of this patent is extended or adjusted under 35 U.S.C. 154(b) by 0 days.

(21) Appl. No.: 13/515,270

(22) PCT Filed: Jun. 1, 2010

(86) PCT No.: PCT/KR2010/003540
§ 371 (c)(1),
(2), (4) Date: Dec. 12, 2012

(87) PCT Pub. No.: WO2011/071217
PCT Pub. Date: Jun. 16, 2011

(65) Prior Publication Data
US 2013/0139732 A1    Jun. 6, 2013

(30) Foreign Application Priority Data

Dec. 11, 2009 (KR) .......... 10-2009-0123481

(51) Int. Cl.
*C04B 33/132* (2006.01)
*C04B 33/32* (2006.01)
*C04B 33/13* (2006.01)
*C04B 18/18* (2006.01)

(52) U.S. Cl.
USPC .......... 106/811; 106/681; 106/697; 106/813; 106/814

(58) Field of Classification Search
USPC .......... 106/681, 697, 811, 813, 814
See application file for complete search history.

(56) References Cited

U.S. PATENT DOCUMENTS

2008/0229978 A1    9/2008    De La Roij

FOREIGN PATENT DOCUMENTS

| EP | 0479411 A2 | 4/1992 |
|---|---|---|
| KR | 1020040086981 A | 10/2004 |
| KR | 10-0859002 | 9/2008 |

OTHER PUBLICATIONS

Search Report, Jan. 4, 2011.

*Primary Examiner* — Anthony J Green
(74) *Attorney, Agent, or Firm* — Tristan A. Fuierer; Andrew D. Gerschutz; Moore & Van Allen, PLLC

(57) ABSTRACT

The present invention relates to a manufacturing method of manufacturing lightweight construction materials using sludge waste, more specifically to a manufacturing method of manufacturing lightweight construction materials using the sludge waste which is manufactured by adding feldspar, bentonite, zeolite, loess, mica and agalmatolite to sludge waste and the lightweight construction materials manufactured thereby. According to the present invention, lightweight construction materials can be manufactured which are environmentally friendly by recycling waste sludge, can reduce energy consumption by simplifying the processes, and have superior strength and water permeability by mixing specific inorganic materials.

4 Claims, 4 Drawing Sheets

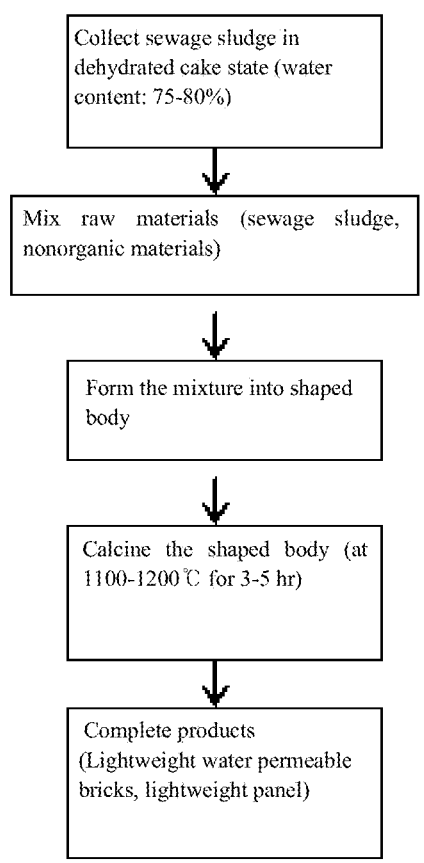

Fig. 3
TEST REPORT
Receipt No.
Receipt date
November 11, 2009
Applicant
LEE, Se-Lin
Address
306 Ohyang-ri, Silchon-eup, Gwangju-si, Gyeonggi-do : Sample name: water permeable block (sewage sludge)
Test Results
Test items: Compressive strength
Unit
Sample No.
Results
Test method : Use Purpose of Test Report: For quality test of products Remark: 1. This test report is based on a result of the test conducted on samples sample names proposed by applicant, and use other than the specified use purpose is prohibited.
2. : This test report shall not be used for the purpose of promotion, advertisement, and litigation without the prior written consent of Korea Institute of Construction Materials.
person in charge
JUNG, Seok-Won
Korea Institute of Construction Materials
405-240 1011-1, 032-472-9001)
: (Incheon Support Office, Address: 1011-1 Mansu-dong, Namdong-gu, Incheon 405-240, South Korea, Tel: +082-032-472-9001)

MANUFACTURING METHOD OF LIGHTWEIGHT CONSTRUCTION MATERIALS USING SLUDGE WASTE

CROSS-REFERENCE TO RELATED APPLICATIONS

This application is filed under the provisions of 35 U.S.C. §371 and claims the priority of International Patent Application No. PCT/KR2010/003540 filed on 01 Jun. 2010 entitled "MANUFACTURING METHOD OF LIGHTWEIGHT CONSTRUCTION MATERIALS USING SLUDGE WASTE" in the name of Se-Lin LEE, which claims priority to Korean Patent Application No. 10-2009-0123481 filed on 11 Dec. 2009, both of which are hereby incorporated by reference herein in their entirety.

TECHNICAL FIELD

The present invention relates to a method of manufacturing lightweight construction materials using sludge waste, and more particularly, to such a method of manufacturing lightweight construction materials using sludge waste, the method comprising adding feldspar, bentonite, zeolite, loess, mica and agalmatolite to sludge waste, and lightweight construction materials manufactured by the same.

BACKGROUND ART

In general, sludge and all the residues but not organic materials, which are generated in filtration plants or sewage treatment plants, factories or incinerating facilities and the like, are classified as wastes and are disposed of by a specified method through a collection process. However, collection and disposal of such waste sludge requires a large-sized collection facility and a collection plant to be installed. In addition, the waste sludge collected is not buried and disposed of as it is, but is buried in a state in which the waste sludge is mixed with clay picked to obtain natural regeneration in an environmental aspect. For this reason, the amount of clay consumed as well as the volume of the waste sludge and the amount of waste sludge buried due to mixed clay are increased excessively, which makes it difficult to designate and establish a waste dump.

In the process of disposing of waste sludge, excessive waste disposal cost is spent, and because the designed waste dump must not have an effect on soil or environment of adjoining areas, pre-treatment and post-management are very strictly carried out, leading to a significant increase in expense.

In addition, natural construction materials become increasingly deficient along with the development of the industrial society. In this context, there has been proposed a method which manufactures lightweight aggregate as a construction material, which comprises: mixing sludge waste with an inorganic material; forming the mixture into a desirably shaped body; and drying and calcining the shaped body to obtain a construction material. The lightweight aggregate thus manufactured has an advantage in which the specific gravity of concrete used can be reduced as well as soundproof and thermal insulation can be obtained simultaneously.

For example, in Korean Patent Registration No. 10-0859002, there has been proposed a method of manufacturing artificial lightweight aggregate using sewage sludge, which comprises: grinding sewage sludge, coal fly ash, and clay into small particles having a size of less than 1 mm; forming the mixture into a shaped body; calcining the shaped body at 1100° C. to 1200° C. for 10 to 15 minutes to obtain the lightweight aggregate. Further, in Korean Patent Registration No. 10-0450898, there has been proposed a method of manufacturing calcined construction materials using sewage sludge, which comprises: primarily drying and grinding sewage sludge in a dehydrated cake state for 24 hours; mixing the ground sewage sludge with clay, silica sand, plaster, and blast furnace slag powder, forming the mixture into a shaped body, and secondarily drying the shaped body; and calcining the dried body at 900° C. to 1100° C. for 13 hours to obtain the construction materials. As such, many patents have proposed various methods. The inventions of the above patents have an effect in that lightweight aggregate can be manufactured without any leaching of heavy metals, but still entails a problem in that much energy is consumed in the course of manufacturing the construction materials, diversification of products is difficult, and the strength is weak in case of a product manufactured using the residues generated after incineration.

Accordingly, the present inventors have made extensive efforts to solve the above-described problems occurring in the prior art and, as a result, have found that lightweight construction material having excellent physical properties can be manufactured through a simplified process by adding feldspar, bentonite, zeolite, loess, mica and agalmatolite to sludge waste, thereby completing the present invention.

DISCLOSURE OF INVENTION

Technical Problem

An object of the present invention is to provide a method of a manufacturing a lightweight construction material using sludge waste, in which the lightweight construction material having excellent physical properties can be manufactured by recycling waste sludge through a simplified process.

Technical Solution

In order to achieve the above objects, in one aspect, the present invention provides a method of a manufacturing a lightweight construction material using sludge waste, the method comprising the steps of:

(a) preparing a mixture comprising sludge waste, 10-60 parts by weight, based on 100 parts by weight of the sludge waste, of feldspar, 30-110 parts by weight of bentonite, 40-100 parts by weight of zeolite, 40-110 parts by weight of loess, 30-160 parts by weight of mica, and 30-40 parts by weight of agalmatolite;

(b) forming the mixture into a shaped body; and (c) calcining the shaped body to obtain the lightweight construction material.

In anther aspect, the present invention provides a lightweight construction material, which comprises sludge waste, 10-60 parts by weight, based on 100 parts by weight of the sludge waste, of feldspar, 30-110 parts by weight of bentonite, 40-100 parts by weight of zeolite, 40-110 parts by weight of loess, 30-160 parts by weight of mica, and 30-40 parts by weight of agalmatolite.

Advantageous Effects

According to the present invention, lightweight construction materials can be manufactured which in excellent in compressive strength and water permeability by mixing specific inorganic materials.

BRIEF DESCRIPTION OF THE DRAWINGS

FIG. 2 shows a process flowchart for describing the manufacture of a lightweight construction material using sewage sludge waste in a dehydrated cake state;

FIG. 3 shows a test result of the compressive strength of Examples 1, 2 and 3 of a lightweight construction material manufactured using sewage sludge waste in a dehydrated cake state.

BEST MODE FOR CARRYING OUT THE INVENTION

Figure 1:
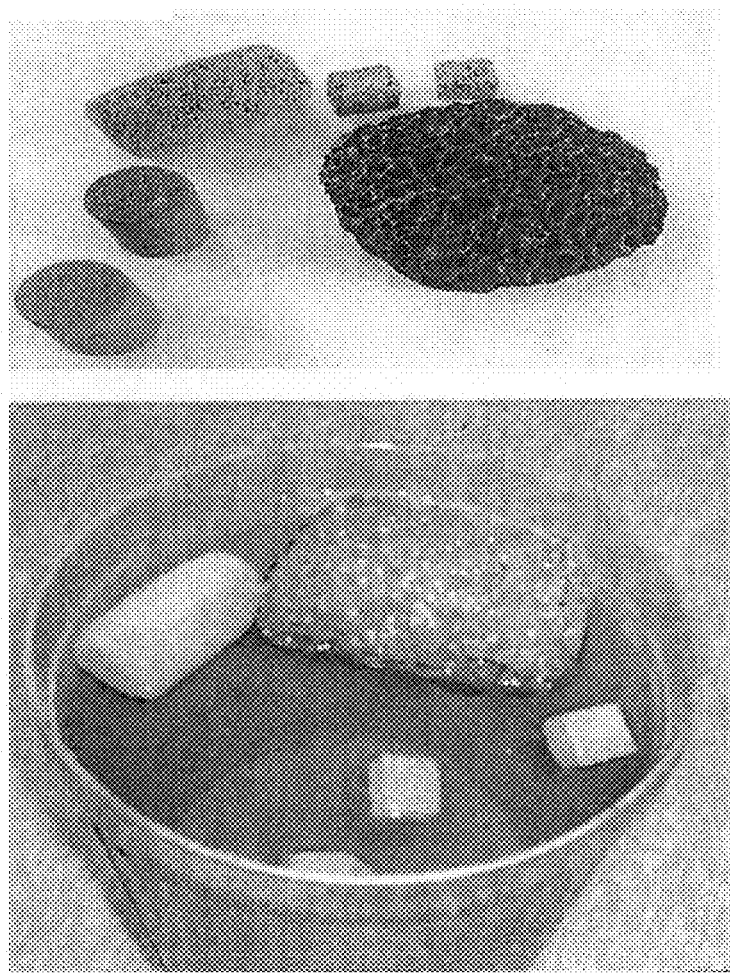
FIG. 1 shows photographs of lightweight construction material products manufactured according to the present invention and the state in which the lightweight construction material products are floated on water.

Unless defined otherwise, all technical and scientific terms used herein have the same meaning as commonly understood by one of ordinary skill in the art to which the invention pertains. Generally, the nomenclature used herein and the experiment methods which will be described later are those well known and commonly employed in the art.

In one aspect, the present invention is directed to a method of a manufacturing a lightweight construction material using sludge waste, the method comprising the steps of: (a) preparing a mixture comprising sludge waste, 10-60 parts by weight, based on 100 parts by weight of the sludge waste, of feldspar, 30-110 parts by weight of bentonite, 40-100 parts by weight of zeolite, 40-110 parts by weight of loess, 30-160 parts by weight of mica, and 30-40 parts by weight of agalmatolite; (b) forming the mixture into a shaped body; and (c) calcining the shaped body to obtain the lightweight construction material.

In the present invention, a lightweight construction material is referred to as a material that is necessary for the construction of a building or structure, such as lightweight brick, block, lightweight panel, lightweight aggregate, and the like.

In the present invention, sludge refers to a material that is obtained in various steps of a sewage treatment process, sludge that leaches from the filtration and precipitation of raw water introduced from a water pipe or a water intake well in a water purification process, and the like. Because sludge contains organic materials and is high in water content, it is disposed of by a method which sludge is buried after stabilized by an anaerobic treatment and dehydrated, or it is treated by hauling of sludge into river or sea, or water lifting and then is dumped to the sea. However, the sludge reclamation method has a drawback in that it is difficult to secure a landfill site due to an increase in the amount of sludge buried, and the sludge dumping method has a shortcoming in that a sludge treatment process is complicated and a risk of environmental pollution cannot be excluded completely. Accordingly, the present invention suggests a method of manufacturing a lightweight construction material by using sludge waste through a simplified process, so that the economical effect could be obtained as well as the environmental pollution could be reduced.

In the present invention, feldspar is an aluminum silicate mineral having a Mohs hardness of 6 and a specific gravity of 2 to 2.7. Also, feldspar cleaves in two directions at 90 degrees, and takes a white, grayish, or dark brownish color, etc. In the present invention, feldspar is added to improve the adhesive force of construction materials, allow the calcination temperature of a shaped body to be lowered to save energy, and increase the compressive strength of the resulting construction material.

In the present invention, loess refers to a sediment consisting of particles having a diameter of from 0.002 to 0.005 mm, which is equal to the size of a silt. Loess takes a yellow-brownish color and is not easily subjected to weathering. In addition, loess forms an angled vertical wall face and contains quartz. Besides, loess is calcareous as containing pyroxene, amphibole, and the like. Loess is added when construction materials are manufactured so that their strength is increased due to excellent sintering properties, far-infrared ray radiating and deodorizing effects can be obtained, abrasion due to machines is small, the calcination temperature can be lowered to save energy.

In the present invention, bentonite is a natural clay mineral formed by transformation of fine glassy particles derived from volcanic ash. Bentonite refers to a clay that mainly contains montmorillonite as a mineral belonging to a monoclinic system, which has the same crystal structure as that of mica. Bentonite takes a white, grayish, light brownish, or light greenish color, and is added in the manufacture of construction materials to improve an adhesive force and a water-absorbing power.

In the present invention, zeolite is a generic term for minerals as aluminosilicate hydrates of alkaline and alkaline earth metal. Zeolite is characterized in that it has a structure in which (Si, Al) $O_4$ tetrahedrons are linked together to form a three-dimensional mesh and a large gap exists in the center thereof. There are many kinds of zeolite, but they have a commonality in high water content, nature of crystals, and occurrences. Zeolite has a Mohs hardness of 6 or less and a specific gravity of about 2.2. In addition, zeolite is generally colorless and transparent or white and semi-transparent. It improves the water-absorbing power of construction materials as being a porous material, makes the products lightweight, and acts to deodorize any unpleasant odors.

In the present invention, dust is a solid particle that is present in the air or gas. It is generated by the mechanical disintegration of a parent material in the explosion, destroying, and cutting processes. In addition, dust may be floated in the air by the actions of volcanic eruption, wind, rock fracture, weathering, meteorite, and the like, or may be formed by pollen of plants, desquamation of animals, bacteria, and the like. The particle size of dust is in the range of from 0.01 μm to 100 μm. Because the content of clay can be reduced by addition of dust in the manufacture of the construction materials, the manufacture expense can be saved. In addition, dust is added to the calcination temperature to be lowered to save energy and improves the sintering properties.

In the present invention, mica is an important rock-forming mineral among granites, i.e., a layered silicate mineral. Mica has a Mohs hardness of from 2.5 to 4 and a specific gravity of from 2.75 to 3.2. Also, mica takes a yellowish, brownish, and greenish color. Germanium is contained in mica at a concentration of about 2.82 ppm so that the spectral distribution of far-infrared rays is high and thus a degree of radiation of far-infrared rays is high. Mica is added to the products to exhibit the deodorizing and antibacterial effects, improve an adhesive force when the products are formed, and reduce mechanical abrasion as not containing an arenaceous component.

In the present invention, agalmatolite has the following general chemical formula: $Al_2O_3 4SiO_2 H_2O$. The theoretical content ratio of the components of agalmatolite is as follows: $Al_2O_3$: 28.3%, $SiO_2$: 66.7%, $H_2O$: 5%. Agalmatolite has various colors ranging from a white base color to a greenish base color. In addition, agalmatolite has a specific gravity of from 2.7 to 2.9 and a very low Mohs hardness of from 1 to 2. Agalmatolite is added in the manufacture of construction materials to induce a Pozzolanic reaction with water to impart the strength to the construction materials, improve resistance to water and corrosion resistance, and exhibit a noise or moisture absorbing effect.

In the present invention, clay refers to a very fine soil particle having a diameter of less than 0.004 mm, which has a much larger surface area per unit weight than that of a particle of sand or silt, and thus has a stronger ability to hold water. Clay is added in the manufacture of construction materials to improve an adhesive force when the product is formed, and allow sintering to occur well even at low temperature.

In the present invention, the lightweight construction material manufactured by the method of manufacturing lightweight construction materials using sludge waste comprises sludge waste, 10-60 parts by weight, based on 100 parts by weight of the sludge waste, of feldspar, 30-110 parts by weight of bentonite, 40-100 parts by weight of zeolite, 40-110 parts by weight of loess, 30-160 parts by weight of mica, and 30-40 parts by weight of agalmatolite.

In the present invention, if the content of feldspar is less than 10 parts by weight based on 100 parts by weight of the sludge waste, the strength of the products may be deteriorated. On the contrary, if the content of feldspar exceeds 60 parts by weight based on 100 parts by weight of the sludge waste, an expense-related problem will occur.

In the present invention, if the content of bentonite is less than 30 parts by weight based on 100 parts by weight of the sludge waste, the water-absorbing power of the products may be deteriorated. On the contrary, if the content of bentonite exceeds 110 parts by weight based on 100 parts by weight of the sludge waste, an expense-related problem will occur.

In the present invention, if the content of zeolite is less than 40 parts by weight based on 100 parts by weight of the sludge waste, the water-absorbing power of the products may be deteriorated and lightweightness of the products may not be attained well. On the contrary, if the content of zeolite exceeds 100 parts by weight based on 100 parts by weight of the sludge waste, the strength of the products may be deteriorated.

In the present invention, if the content of loess is less than 40 parts by weight based on 100 parts by weight of the sludge waste, energy loss may occur due to a decrease in the strength of the products and an increase in the calcination temperature. On the contrary, if the content of loess exceeds 110 parts by weight based on 100 parts by weight of the sludge waste, an expense-related problem will occur.

In the present invention, if the content of mica is less than 30 parts by weight based on 100 parts by weight of the sludge waste, the forming ability may be deteriorated. On the contrary, if the content of mica exceeds 160 parts by weight based on 100 parts by weight of the sludge waste, an expense-related problem will occur.

In the present invention, if the content of agalmatolite is less than 30 parts by weight based on 100 parts by weight of the sludge waste, the strength of the products may be deteriorated. On the contrary, if the content of agalmatolite exceeds 40 parts by weight based on 100 parts by weight of the sludge waste, an expense-related problem will occur.

In the present invention, if the content of dust is less than 10 parts by weight based on 100 parts by weight of the sludge waste, energy loss may occur due to an increase in the calcination temperature. On the contrary, if the content of dust exceeds 20 parts by weight based on 100 parts by weight of the sludge waste, the strength of the products may be deteriorated.

In the present invention, the forming step can be performed in a general method. Preferably, the forming step is performed by putting the mixture into a dry-type press and pressing it under the pressure of 1200 to 1500 tons.

In the present invention, the calcination step can be performed in a general calcination method such as using a tunnel kiln, etc., and is performed at a temperature of from 1140 to 1190° C. for 3 to 5 hours. The water permeability of a construction material thus manufactured is determined under the control of the calcination temperature. If the calcination temperature is less than 1140° C., the strength of the products may be deteriorated. Contrarily, if the calcination temperature exceeds 1190° C., water-permeable pores will be clogged, leading to a decrease in water permeability.

In another aspect, the present invention is directed to a lightweight construction material, which comprises sludge waste, 10-60 parts by weight, based on 100 parts by weight of the sludge waste, of feldspar, 30-110 parts by weight of bentonite, 40-100 parts by weight of zeolite, 40-110 parts by weight of loess, 30-160 parts by weight of mica, and 30-40 parts by weight of agalmatolite.

The lightweight construction material manufactured using sludge waste according to the present invention is controlled so that its specific gravity is low, and it can be observed that the construction material is floated on the water when it is submerged in it, which is shown in FIG. 1.

The lightweight construction material according to the present invention is manufactured by the method of manufacturing the lightweight construction material using sludge waste in such a manner that sludge waste is carried in a dehydrated cake state, it is mixed with inorganic materials without any pre-treatment process and the mixture is formed into a shaped body, and the shaped body is calcined to manufacture a lightweight construction material. Thus, a drying step is removed so that water and energy can saved, the generation of arsenic, dust and odor can be suppressed, and the mass-production of the lightweight construction material products is possible. In addition, it is possible to provide a construction material recycling sludge waste in which its specific gravity and air bubbles is controlled in various manners and its strength is improved by a method of mixing different various inorganic materials.

EXAMPLES

Hereinafter, the present invention will be described in further detail with reference to examples. It will be obvious to those skilled in the art that these examples are illustrative purposes only and are not to be construed to limit the scope of the present invention.

Example 1

Manufacture of Lightweight Construction Material Using Sewage Sludge Waste

The manufacture of a lightweight construction material using sewage sludge waste in a dehydrated cake state was performed under the conditions of mixing ratio, calcination temperature, and calcination time, which are listed in Table 1 below through a process shown in FIG. 2. The sewage sludge waste and minerals were mixed together in a mixer, and then the mixture was formed into a shaped body using a dry press forming machine (INOCATOR). Thereafter, the shaped body was calcined using a tunnel kiln (available from GUN WOO Carbide Co., Ltd.).

In Example 1, the sewage sludge waste in the dehydrated cake state was mixed with minerals after being produced in a sewage treatment plant situated in Gwangju-shi, Gyeonggi-do, South Korea, and immediately transported without any other treatment processes. The water content of the sewage sludge waste was in the range of from 75% to 80%. Feldspar has the chemical formula of $K_2O_9Na_2O_3SiO_2$. Thus, feldspar consists of three chemical compounds. In case of feldspar, a product having a particle size of less than 2 mm was purchased from the Imgae mine located in Jeongseon-gun, Kangwondo, Korea, and in case of loess, a product having a particle size of less than 2 mm was purchased from Poonghyang Loess Co., Ltd. In addition, in case of bentonite, a product having a particle size of less than 3 mm was purchased from SR GREEN TEC Co., Ltd., and zeolite was purchased from SR GREEN TEC Co., Ltd. Dust was used which has a particle size of about 375 mesh.

TABLE 1

| Classification | Components (wt %) | | | | | | Calcination temperature (° C.) | Calcination time | Products |
|---|---|---|---|---|---|---|---|---|---|
| | Sewage sludge (cake state) | Feldspar | Loess | Bentonite | Zeolite | Dust | | | |
| Comparative Example | 45 | 10 | 15 | 10 | 15 | 5 | 1160 | 4 hr | bricks, blocks |
| Example 1 | 40 | 20 | 40 | — | — | — | 1160 | 4 hr | Lightweight water permeable bricks |
| Example 2 | 50 | 20 | — | 30 | — | — | 1150 | 3 hr 30 min | Lightweight water permeable bricks |
| Example 3 | 50 | — | — | — | 50 | — | 1190 | 4 hr 30 min | lightweight panel |
| Example 4 | 50 | — | 50 | — | — | — | 1190 | 4 hr | lightweight brick |
| Example 5 | 50 | — | — | 20 | 20 | 10 | 1160 | 4 hr | Lightweight water permeable bricks |

In the above Example 1, the calcination was performed for 3 hours 30 minutes to 4 hours 30 minutes and the calcination temperature was in the range of from 1150° C. to 1190° C. Herein, a lightweight water permeable product could be manufactured at a calcination temperature of less than 1160° C., and a general lightweight brick could be manufactured at a calcination temperature of from 1180° C. to 1190° C.

Test Example 1

Physical Properties Test of Construction Material Manufactured in Example 1

A measurement result of the compressive strength through the test showed that the compressive strength of the construction material manufactured in Example 1 equals or is superior to that in Comparative Example. In addition, it can be seen in Table 1 below that the specific gravity of the construction material manufactured in Example 1 was measured to be low so that the construction material could be utilized as a lightweight product. Water absorption showed a difference between Examples depending on the calcination temperature. If the product was calcined at 1180° C. or more, the water absorption was measured to be low. The test result was shown in Table 2 below. For the compressive strength of Examples 1, 2 and 3, a result of the test performed in the KS F 4004:2008 test method was shown in FIG. 3.

TABLE 2

| Classification | Comparative Example | Example 1 | Example 2 | Example 3 | Example 4 | Example 5 |
|---|---|---|---|---|---|---|
| Specific gravity (g/cm³) | 100 | 58/100 | 61/100 | 66/100 | 77/100 | 75/100 |
| Water absorption (%) | 0.06 | 0.22 | 0.24 | 0.07 | 0.06 | 0.22 |
| Compressive strength (N/m²) | 17 | 17 | 16 | 16 | 17 | 17 |

Example 2

Figure 4:
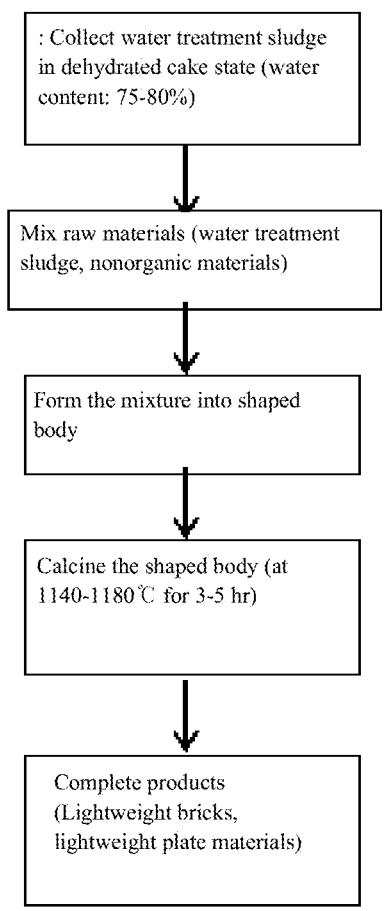
FIG. 4 is a process flowchart for describing the manufacture of a lightweight construction material using water treatment sludge waste in a hydrated cake state.

Manufacture of Lightweight Construction Material Using Water Treatment Sludge Waste The manufacture of a lightweight construction material using water treatment sludge waste in a dehydrated cake state was performed under the conditions of mixing ratio, calcination temperature, and calcination time, which are listed in Table 3 below through a process shown in FIG. 4. The water treatment sludge waste and minerals were mixed together in a mixer, and then the mixture was formed into a shaped body using a dry press forming machine (INOCATOR). Thereafter, the shaped body was calcined using a tunnel kiln (available from GUN WOO Carbide Co., Ltd.).

In Example 2, the water treatment sludge waste in the dehydrated cake state was mixed with minerals after being produced in a treatment plant situated in Gwangju-shi, Gyeonggi-do, South Korea, and immediately transported without any other treatment processes. The water content of the water treatment sludge waste was in the range of from 75% to 80%. In case of Mica, a product having a particle size of less than 2 mm was purchased in Bonghwa-gun, Gyeongsangbuk-do, Korea. Agalmatolite was purchased in an agalmatolite mine situated in Gyeongju-si, Korea, and zeolite was purchased from SR GREEN TEC Co., Ltd. In addition, feldspar has the chemical formula of $K_2O_9Na_2O_3SiO_2$. Thus, feldspar consists of three chemical compounds. In case of feldspar, a product having a particle size of less than 2 mm was purchased from the Imgae mine located in Jeongseon-gun, Kangwondo, Korea, and in case of bentonite, a product having a particle size of less than 3 mm was purchased from SR GREEN TEC Co., Ltd.

tion material manufactured in Example 2 is superior to that in Comparative Example. In addition, it can be seen in Table 2 below that the specific gravity of the construction material manufactured in Example 2 was measured to be low so that the construction material could be utilized as a lightweight product. Water absorption of the construction material manufactured in Example 2 was measured to be generally higher

TABLE 3

| Classification | Components (wt %) | | | | | | | Calcination temperature (° C.) | Calcination time | Products |
| | Sewage sludge (cake state) | Mica | Agalmatolite | Zeolite | Feldspar | Loess | Bentonite | | | |
| --- | --- | --- | --- | --- | --- | --- | --- | --- | --- | --- |
| Comparative Example | 60 | — | 5 | 15 | — | 10 | 10 | 1160 | 4 hr | bricks |
| Example 1 | 50 | 35 | 15 | — | — | — | — | 1160 | 4 hr | Lightweight water permeable bricks |
| Example 2 | 60 | — | — | 30 | 10 | — | — | 1170 | 3 hr 30 min | Lightweight water permeable bricks |
| Example 3 | 70 | — | — | — | — | 30 | — | 1180 | 3 hr 30 min | Lightweight water permeable products |
| Example 4 | 50 | — | — | 40 | 10 | — | — | 1160 | 4 hr | Lightweight water permeable bricks |
| Example 5 | 50 | — | — | — | 20 | — | 30 | 1145 | 3 hr 30 min | Lightweight water permeable bricks |
| Example 6 | 60 | — | — | — | 10 | 30 | — | 1150 | 5 hr | Plate materials |
| Example 7 | 60 | 20 | — | — | — | — | 20 | 1180 | 3 hr 30 min | Lightweight products | than that of the product using the sewage sludge waste in Example 1. The test result was shown in Table 4 below.

TABLE 4

| Classification | Comparative Example | Example 1 | Example 2 | Example 3 | Example 4 | Example 5 | Example 6 | Example 7 |
| --- | --- | --- | --- | --- | --- | --- | --- | --- |
| Specific gravity (g/cm$^3$) | 100 | 68/100 | 59/100 | 66/100 | 60/100 | 62/100 | 60/100 | 63/100 |
| Water absorption (%) | 0.11 | 0.22 | 0.26 | 0.23 | 0.27 | 0.26 | 0.22 | 0.25 |
| Compressive strength (N/m$^2$) | 15 | 17.5 | 17 | 17 | 16 | 17 | 17.5 | 17 |

Herein, a water permeable product could be manufactured at a calcination temperature of less than 1180° C., and a water impermeable product could be manufactured at a calcination temperature of more than 1180° C.

Test Example 2

Physical Properties Test of Construction Material Manufactured in Example 2

A measurement result of the compressive strength through the test showed that the compressive strength of the construc-

INDUSTRIAL APPLICABILITY

As described above, the manufacturing method of a lightweight construction material using sludge waste according to the present invention enables waste sludge to be recycled, and can save energy by omitting or abridging the drying, crushing, and incinerating processes to prevent dioxin from being generated in such processes. In addition, according to the present invention, lightweight construction materials can be manufactured which is excellent in compressive strength and water permeability by mixing specific inorganic materials.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

The invention claimed is:

1. A method of a manufacturing a lightweight construction material using sludge waste, the method comprising the steps of:
   (a) preparing a mixture comprising sludge waste, 10-60 parts by weight, based on 100 parts by weight of the sludge waste, of feldspar, 30-110 parts by weight of bentonite, 40-100 parts by weight of zeolite, 40-110 parts by weight of loess, 30-160 parts by weight of mica, and 30-40 parts by weight of agalmatolite;
   (b) forming the mixture into a shaped body; and
   (c) calcining the shaped body to obtain the lightweight construction material.

2. The method of claim 1, wherein the step (c) is performed at a temperature of from 1140 to 1200° C. for 3 to 5 hours.

3. A lightweight construction material manufactured by the method of claim 1, which contains feldspar, bentonite, zeolite, loess, mica, and agalmatolite.

4. A lightweight construction material, which comprises sludge waste, 10-60 parts by weight, based on 100 parts by weight of the sludge waste, of feldspar, 30-110 parts by weight of bentonite, 40-100 parts by weight of zeolite, 40-110 parts by weight of loess, 30-160 parts by weight of mica, and 30-40 parts by weight of agalmatolite.

* * * * *